United States Patent [19]

Parlman et al.

[11] Patent Number: 4,530,982

[45] Date of Patent: Jul. 23, 1985

[54] POLYMERIZATION USING BENZENEDIAZONIUM TETRAFLUOROBORATE/TITANIUM TETRAHALIDE-BASED CATALYSTS

[75] Inventors: Robert M. Parlman; Charles M. Selman, both of Bartlesville, Okla.

[73] Assignee: Phillips Petroleum Company Bartlesville, Okla.

[21] Appl. No.: 655,610

[22] Filed: Sep. 28, 1984

Related U.S. Application Data

[62] Division of Ser. No. 525,517, Aug. 22, 1983, Pat. No. 4,487,844.

[51] Int. Cl.$^3$ .......................... C08F 4/64; C08F 10/00
[52] U.S. Cl. .................................. 526/115; 526/119; 526/133; 526/134; 526/352
[58] Field of Search ............... 526/115, 119, 133, 132, 526/134, 131

[56] References Cited

U.S. PATENT DOCUMENTS

| | | |
|---|---|---|
| 2,840,551 | 6/1958 | Field et al. . |
| 3,189,589 | 6/1965 | Witt . |
| 3,303,239 | 2/1967 | Cleary et al. . |
| 3,513,147 | 5/1970 | Fodor et al. . |
| 3,514,433 | 5/1970 | Nicco . |
| 4,151,110 | 4/1979 | Cesca et al. .......................... 526/115 |
| 4,210,729 | 7/1980 | Hermans ............................. 526/119 |

*Primary Examiner*—Edward J. Smith

[57] ABSTRACT

A catalyst system is provided comprising a titanium catalyst component produced by contacting a benzenediazonium tetrafluoroborate with a titanium tetrahalide such as titanium tetrachloride and a cocatalyst. Preferred cocatalysts are organoaluminum compounds. The catalyst system of this invention is broadly suitable for this polymerization of 1-olefins and is particularly suited for the production of high molecular weight ethylene polymers.

22 Claims, No Drawings

POLYMERIZATION USING BENZENEDIAZONIUM TETRAFLUOROBORATE/TITANIUM TETRAHALIDE-BASED CATALYSTS

This application is a divisional of application Ser. No. 525,517, filed Aug. 22, 1983, now U.S. Pat. No. 4,487,844.

BACKGROUND OF THE INVENTION

Titanium tetrahalide compounds have long been used for olefin polymerization and have found particular utility in the polymerization of propylene although they have also found utility in the polymerization of ethylene. Generally, such catalyst systems exhibit sensitivity to hydrogen and other materials which have been found to act as molecular weight control agents whereby on incorporation of a small amount of such agents, higher melt flow polymers are obtained. In general, this is desirable although there are instances where it would be desirable to have a catalyst which is not sensitive to molecular weight control agents. Such a catalyst would be of value as one component of a mixed catalyst system for obtaining a polymer with broad molecular weight distribution.

SUMMARY OF THE INVENTION

It is an object of this invention to provide an improved titanium-based catalyst system;

It is a further object of this invention to provide a titanium catalyst system especially suited for ethylene polymerization;

It is still a further object of this invention to provide a titanium catalyst system which is particularly suitable for ethylene polymerization.

It is yet a further object of this invention to provide a catalyst system which is relatively insensitive to the effect of molecular weight agents such as hydrogen; and It is still yet a further object of this invention to provide improved olefin polymerization processes.

In accordance with this invention, there is provided a catalyst system comprising (1) a titanium catalyst component produced by contacting a benzenediazonium tetrafluoroborate with a titanium tetrahalide such as titanium tetrachloride and (2) a cocatalyst selected from organoboron and organometal compounds, preferably organoaluminum compounds.

DESCRIPTION OF THE PREFERRED EMBODIMENTS

The titanium tetrahalide is titanium tetrachloride, titanium tetrabromide, or titanium tetraiodide, preferably titanium tetrachloride.

The benzenediazonium tetrafluoroborate compound is a compound of the formula

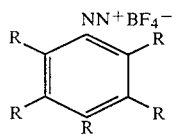

wherein R is hydrogen or in the alternative up to two R's can be selected from halogen or 1 to 12 carbon atom hydrocarbon groups, preferably 1 to 6 carbon atom alkyl groups. Thus, while either substituted or unsubstituted benzenediazonium tetrafluoroborates are suitable, it is preferred that R be a hydrogen thus giving the simple compound, benzenediazonium tetrafluoroborate.

Relatively small amounts of the benzenediazonium tetrafluoroborate are effective. Thus a mole ratio of benzenediazonium tetrafluoroborate:titanium tetrahalide of from 1:1 to 1:1000 can be used. Preferably the ratio is from 1:5 to 1:100.

The titanium tetrahalide can be reacted with the benzenediazonium tetrafluoroborate alone or in the presence of an effective amount of a suitable transition metal carbonyl catalyst such as iron carbonyl. Since the reaction can be carried out with no catalyst and since catalyst residue may be undesirable, very small amounts of catalyst are generally used. For instance 0.00000001 to 0.0001, preferably 0.0000002 to 0.000012 millimoles per millimole of titanium tetrahalide can be used. Other easily produced or commercially available catalyst include carbonyls or nickel, tungsten and manganese. $Fe(CO)_5$ is particularly preferred. The reaction can take place at any convenient temperature. For convenience room temperature is entirely satisfactory. The benzenediazonium tetrafluoroborate can be suspended in an inert diluent such as dry hexane or other normally liquid hydrocarbons or it can be combined neat with the titanium tetrahalide. For convenience ambient temperature and pressure can be used although, if desired, an elevated temperature can be used to speed up the reaction, and if desired, pressure can be utilized so as to use a lower boiling solvent if solvent is desired. Broadly, temperatures of 0° to 100° C., preferably 25° to 70° C., are satisfactory. The reaction can be carried out by simple stirring of the reactants. Time for the reaction can vary, for instance as little as one minute or as much as 24 hours can be utilized.

The catalysts produced according to this invention occur in the form of solid, finely divided substances. Subsequent to the reaction, the resulting catalyst can be washed several times with solvent such as aliphatic hydrocarbons until virtually all soluble halides are removed in the washing solvent as indicated by the absence of halides in the wash. The resulting catalyst can be dried under vacuum and preserved in a dry condition or preferably, it can be preserved in suspension in the last charge of washing solvent. It is important that during preparation and preservation the catalysts are protected from oxygen and moisture. The resulting solid material forms the titanium catalyst component of this invention.

It is also within the scope of this invention to treat the catalyst, generally after washing, with an adjuvant, preferably an ether as defined hereinafter. This can be carried out under the same conditions as the reaction to produce the catalyst, with slightly elevated temperatures, i.e. 30° to 120° C. being preferred. In addition, the thus adjuvant-treated catalyst can be further treated with a titanium tetrahalide such as titanium tetrachloride. This can be done neat or more preferably by using a solvent or diluent of the same type used for the reaction to produce the catalyst in the first place. Alternatively, the catalyst can be treated with the titanium tetrahalide without the adjuvant treatment. Temperatures for the titanium tetrahalide treatment can be the same as for the adjuvant treatment. Time for these treatments can vary from a minute to several hours, generally 1 minute to 24 hours, more generally 0.25 to 10 hours.

The cocatalyst can be an organoboron compound or an organometal. The cocatalyst is preferably an organoaluminum compound selected from trihydrocarbylaluminum compounds of formula AlR″$_3$, dialkylaluminum compounds of formula R″$_2$AlZ, alkylaluminum compounds of the formula R″AlZ$_2$, alkyl aluminum sesquichlorides and dialkylaluminum alkoxides of formula R″$_2$AlOR″ wherein each R′ may be the same or different and represents a hydrocarbyl group, preferably an alkyl group containing from 1 to about 12 carbon atoms per molecule. Z represents either a hydrogen atom or a halogen atom, preferably chlorine or bromine. Preferably the R″AlZ$_2$ compounds are dichlorides or dibromides. Examples of suitable compounds include trimethylaluminum, triethylaluminum, tri-n-dodecylaluminum, dimethylethylaluminum, dimethylaluminum bromide, diethylaluminum chloride, ethylaluminum dichloride, ethylaluminum dihydride, diisobutylaluminum bromide, di-n-dodecylaluminum chloride, ethyl-t-butylaluminum chloride, diisobutylaluminum hydride, ethylaluminum sesquichloride, dimethylaluminum butoxide, diethylaluminum ethoxide, di-n-dodecylaluminum n-propoxide, and ethylmethylaluminum ethoxide and mixtures thereof. Triethylaluminum is preferred. Other organometals include organozinc compounds, such as diethylzinc, and organomagnesium compounds, particularly dialkyl magnesium compounds such as di-n-butyl magnesium.

The organoboron compound cocatalyst is preferably trihydrocarbylborane, more preferably a trialkylborane such as triethylborane.

The cocatalyst is used in an amount to give an atom ratio of metal or boron to titanium 20:1 to 10,000:1, preferably 75:1 to 5,000:1.

The catalyst of this invention is primarily contemplated for use without a separate support. If desired, however, it can be carried on a solid porous support such as silica, silica-alumina, alumina and aluminum phosphate.

The catalyst of this invention is primarily designed for use as an ethylene polymerization catalyst and in ethylene polymerization the preferred cocatalyst is a trialkylaluminum compound, most preferably triethylaluminum or triisobutlylaluminum.

While it is generally necessary to use one or more adjuvants which are polar organic compounds, i.e., electron donor compounds (Lewis bases), in the polymerization of propylene or monomer feeds which are at least predominantly propylene, in the preferred embodiments where ethylene or predominantly ethylene is polymerized no adjuvant is required. Suitable adjuvants in the instances where they are used, are disclosed in U.S. Pat. No. 3,642,746, the disclosure of which is hereby incorporated by reference. They include amides, amines, aldehydes, arsines, alcoholates, esters, ethers, ketones, nitriles, phosphines, phosphites, phosphoramides, stibines, sulfones and sulfoxides. Ethyl anisate, ethyl benzoate, and methyl benzoate are exemplary materials. If desired the catalyst can be precontacted with one or more of these adjuvants, particularly the ethers as described hereinbefore.

The catalyst could be used with or without a molecular weight control agent such as hydrogen. In one embodiment, the catalyst of this invention can be mixed with other catalysts including prior art titanium catalysts, particularly titanium tetrachloride which has been reduced at least in part to titanium trichloride. In polymerization reactions using such a mixed catalyst with a molecular weight control agent such as hydrogen, the prior art catalyst, being more sensitive to the effects of hydrogen will produce a high melt flow, low molecular weight component whereas the catalyst of this invention will produce a low melt flow, high molecular weight material, thus giving a broad molecular weight distribution. The two catalysts can be used in any proportion, for instance a weight ratio of the catalysts of this invention to prior art catalysts within the range of 0.1:1 to 10:1 can be used.

Polymerization using the catalyst produced in accordance with this invention is preferably carried out under slurry or particle form conditions as disclosed for instance in Norwood, U.S. Pat. No. 3,248,179, issued Apr. 26, 1966, the disclosure of which is hereby incorporated by reference. Briefly, this can be accomplished, for example, by conducting the polymerization in the presence of a dry inert hydrocarbon diluent such as pentane, cyclohexane, isobutane, n-heptane, methylcyclohexane or benzene at a reactor temperature within the range of about 60° C. to about 110° C. and a reactor pressure of about 1.7 to about 4.1 MPa (250 to 600 psia). The polymer can be recovered, stabilized with an antioxidant, such as butylated hydroxytoluene (BHT), and dried by conventional methods to obtain the final product. Hydrogen can be used in the reactor as known in the art to provide some control of the molecular weight of the polymer. The polymerization can be conducted batchwise in a stirred reactor or continuously in a loop reactor with or without a settling leg or in a series of reactors. If desired, these catalysts can be used in solution or other conventional polymerization systems such as gas phase polymerization but their primary importance is in slurry systems.

The catalyst of this invention is primarily suitable for the production of normally solid ethylene homopolymer and predominantly ethylene copolymer using as the monomer predominantly ethylene. Ethylene can be copolymerized with one or more higher aliphatic mono-1-olefins containing from 3 to about 10 carbon atoms per molecule such as propylene, 1-butene, 1-pentene, 1-hexene, 1-octene, and/or a conjugated diolefin containing 4 to about 12 carbon atoms. In such polymers, the ethylene content generally ranges from about 97 to 99.6 weight percent which is obtained using from about 93 to 99.6 weight percent ethylene monomer, the remainder being said higher olefin comonomer. More broadly, ethylene copolymers can be made using 80 to 99.8 weight percent ethylene and 20 to 0.2 weight percent comonomer in the feed. Preferred comonomers are propylene, butene-1, pentene-1 and hexene-1. Thus broadly at least one mono-1-olefin having 2 to 10 carbon atoms per molecule can be polymerized. Preferably these are selected from ethylene, propylene, 1-butene, 1-pentene and 1-hexene.

EXAMPLE 1

Preparation of Benzenediazonium Tetrafluoroborate

In a 400 mL beaker containing 30 mL of concentrated hydrochloric acid and 30 mL of water was dissolved 9.2 g (0.1 mole) of aniline. The mixture was cooled to about 0° C. in an ice bath and then diazotized by the addition of a solution containing 7 g (0.1 mole) of sodium nitrite in 12 mL of water. After filtering, the solution was added slowly with stirring to 17 g (0.15 mole) of sodium fluoroborate (NaBF$_4$) dissolved in 30 mL of water at room temperature (although lower temperatures can be used). After stirring another 5 minutes a white precipitate formed which was recovered by filtration, washed with 50 mL of cold water and 50 mL of diethyl ether and dried in vacuum. The yield of benzenediazonium tetrafluoroborate was about 75% of theory. The process (including a final thermal decomposition of the product, which is not employed in this Example), is commonly referred to as the Schiemann method. Kirk-Othmer, Encyclopedia of Chemical Technology, Second Edition, Vol. 9, page 568, Interscience (1966) describes this preparation and shows the equation including the decomposition as follows:

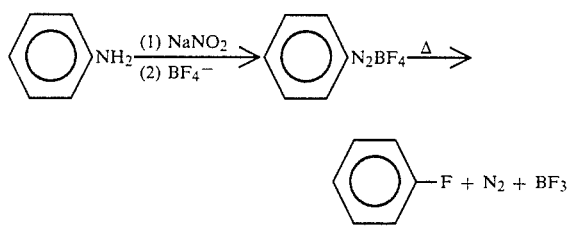

A reference to this method is given in U.S. Pat. No. 3,950,444, column 1, lines 29–37, the disclosure of which is hereby incorporated by reference.

EXAMPLE 2

Catalyst Preparations

Invention catalyst A was prepared in a dry box by charging to a flask containing a magnetic stirring bar, 50 mL (0.455 mole) of $TiCl_4$ and, while stirring, a total of 0.75 g of benzenediazonium tetrafluoroborate was added in portions over a 30 minute period. The suspension became yellowish in color after 30 to 45 minutes and stirring was continued another 6.5 hours. The product was isolated by filtration, washed with dry n-hexane and dried by vacuum to yield a yellowish solid which turned brownish orange in color on sitting undisturbed. Analysis of the product revealed that it contained about 0.66 g $TiCl_3$ per g of product.

Invention catalyst B was prepared in a dry box by charging a Diels-Alder tube with 0.5 catalyst A and 8.5 mL (42 mmoles) of diisoamyl ether which had been previously dried over alumina. The tube and contents were then shaken every 30 minutes for about 7 hours and the tube and contents remained undisturbed overnight (about 15 hours). The next day the reddish-violet solid was separated by filtration, washed with n-hexane and transferred to a 10 oz (296 mL) beverage bottle along with 50 mL of dry n-hexane and 0.25 mL (2.3 mmoles) of $TiCl_4$. The bottle was capped, rotated in a bath at 70° C. for 2 hours and returned to the dry box. The product was isolated by filtration, washed with dry n-hexane and dried by vacuum. The catalyst was still reddish-violet in color. The $TiCl_3$ content was not determined.

Invention catalyst C. Para-chlorobenzene diazonium tetrafluoroborate was prepared from para-chloroaniline, sodium nitrite, hydrochloric acid and sodium tetrafluoroborate following the procedure of Example 1.

In the dry box, a flask containing a magnetic stirring bar was charged with 75 mL of dry n-hexane and 1.0 g (4.4 mmoles) of para-chlorobenzenediazonium tetrafluorobenzoate. While stirring the suspension, 0.5 mL (4.6 mmoles) of $TiCl_4$ was added in increments over $3\frac{1}{2}$ hours. Three hours later, 0.3 mL (2.7 mmoles) of $TiCl_4$ was added and the mixture was stirred about 1 hour more. The mixture was then allowed to stand undisturbed overnight. The next morning, stirring was resumed, 20 microliters (0.00015 mole) of iron carbonyl $[Fe(CO)_5]$ was added and the mixture was stirred another hour. At that time while continuing the stirring, 0.5 mL (4.6 mmoles) of $TiCl_4$ was charged and the mixture was stirred for 7 hours. The mixture was allowed to sit undisturbed over the weekend (about 60 hours). The solid was isolated, washed and dried as before yielding a yellowish-white product.

This catalyst was not tested in ethylene polymerization.

EXAMPLE 3

Ethylene Polymerization

Ethylene was polymerized with individual portions of the catalyst at 80° C. for 1 hour in a stirred stainless steel reactor of 1 gallon (3.8 L) capacity containing 1.2 L of isobutane, 1.0 mL of triisobutylaluminum (0.55 mole) (TIBA) as a 15 weight percent solution in n-heptane. Charge order was catalyst, TIBA and isobutane. Then hydrogen was added to increase the reactor pressure 100 delta psi and ethylene was added to increase the reactor pressure 100 delta psi and the reactor temperature was brought to 80° C. Total reactor pressure was now about 395 psia (2.72 MPa) in run 1 and about 378 psia (2.61 MPa) in run 2. Ethylene was supplied on demand as the polymerization occurred to maintain the stated pressures. After 1 hour on stream each reaction was terminated by venting the gases, the products were recovered, dried and weighed to determine yields. The melt index (MI) and high load melt index (HLMI) values were determined in accordance with ASTM D 1238, Conditions E and F, respectively.

The amount of catalyst used and results obtained are set forth in Table I.

TABLE 1

| | | Ethylene Polymerization, Hydrogen Present | | | |
|---|---|---|---|---|---|
| Run No. | Catalyst No. | Catalyst Weight, g | Polymer Yield, g | Calculated Productivity g PE/g Cat. | Polymer |
| | | | | | MI | HLMI |
| 1 | A | 0.2041 | 122 | 598 | 0[(1)] | 2.5 |
| 2 | B | 0.0870 | 166 | 1910 | 0.027 | 2.0 |

[(1)]Too low to measure.

The results in Table I show that each catalyst is reasonably active in ethylene polymer, especially catalyst B, based on the productivity values. The polymerization runs are conducted under a relatively large hydrogen partial pressure and since hydrogen is known to depress activity of Ti-containing catalysts the above productivity results, especially those of run 2, are rather respectible. Even in the presence of the hydrogen, high molecular weight polymers are produced, giving an unexpected result. In the absence of hydrogen, even higher molecular weight polymers are expected to be produced at much higher rates, e.g., catalyst B could produce polyethylene at an estimated rate of about 15,000 g PE per g catalyst per hour.

Catalyst B differs from catalyst A primarily in that the diazonium complex was prereacted with an alkyl ether before it contacted the $TiCl_4$ and the $TiCl_4$ reaction was done at 70° C. rather than about 25° C. The ether may activate the complex in some manner, perhaps by forming an etherate, which reacted with $TiCl_4$, especially at the higher temperature to form a more active catalyst.

While this invention has been described in detail for the purpose of illustration, it is not to be construed as limited thereby but is intended to cover all changes and modifications within the spirit and scope thereof.

We claim:

1. A polymerization process comprising contacting at least one mono-1-olefin having 2 to 10 carbon atoms per molecule with a catalyst system produced by a process comprising:
   (a) contacting a benzenediazonium tetrafluoroborate with a titanium tetrahalide to produce a catalyst component; and
   (b) combining said catalyst component with a cocatalyst selected from at least one of organometal compounds and organoboron compounds.

2. A method according to claim 1 wherein said olefin is selected from ethylene, propylene, 1-butene, 1-pentene and 1-hexene.

3. A method according to claim 1 wherein said olefin comprises ethylene.

4. A method according to claim 1 wherein said olefin is at least predominantly ethylene and said polymerization is carried out at a temperature within the range of 60° to 110° C.

5. A method according to claim 1 wherein said olefin is predominantly propylene and said polymerization is carried out in the presence of an adjuvant.

6. A method according to claim 1 wherein said olefin is predominantly ethylene and said polymerization is carried out in the absence of an adjuvant.

7. A method according to claim 1 wherein said polymerization is carried out in the presence of hydrogen using in addition a separate catalyst which is hydrogen sensitive so as to give a broad molecular weight distribution polymer.

8. A method according to claim 1 wherein said titanium tetrahalide is titanium tetrachloride and said cocatalyst is an organoaluminum compound.

9. A process according to claim 8 wherein said benzenediazonium tetrafluoroborate is of the formula

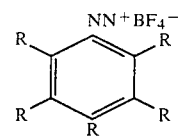

wherein up to two R's can be halogen or a 1 to 12 carbon atom hydrocarbyl group and the remaining R groups are hydrogen.

10. A method according to claim 9 wherein all of said R groups are hydrogen.

11. A method according to claim 8 wherein said contacting to produce said catalyst component is done in the presence of a transition metal carbonyl catalyst.

12. A method according to claim 11 wherein said transition metal carbonyl catalyst is iron carbonyl.

13. A method according to claim 8 wherein said contacting to produce said catalyst component is carried out at a temperature within the range of 0° to 100° C.

14. A method according to claim 8 wherein said cocatalyst is a trialkylaluminum compound.

15. A method according to claim 14 wherein said trialkylaluminum compound is selected from triethylaluminum and triisobutylaluminum.

16. A method according to claim 8 wherein said benzenediazonium tetrafluoroborate and titanium tetrachloride are used in amounts within the range of 1:5 to 1:100 moles of benzenediazonium tetrafluoroborate:titanium tetrahalide and said titanium tetrachloride and organoaluminum compound are used in amounts to give an atom ratio of aluminum to titanium within the range of 75:1 to 5,000:1.

17. A method according to claim 8 wherein solid formed from said reaction between said benzenediazonium tetrafluoroborate and said titanium tetrachloride is washed with hexane and with additional titanium tetrachloride for 0.25 to 10 hours at 30° to 120° C.

18. A method according to claim 8 wherein said catalyst component is precontacted with an adjuvant.

19. A method according to claim 18 wherein said adjuvant is an ether and said contacting is followed by contacting with a titanium tetrahalide.

20. A method according to claim 19 wherein said ether is diisoamyl ether and said titanium tetrahalide is titanium tetrachloride and each of said contacting operations is carried out at a temperature within the range of 30° to 120° C.

21. A method according to claim 20 wherein said cocatalyst is one of triethylaluminum or triisobutylaluminum.

22. A method according to claim 21 wherein said benzenediazonium tetrafluoroborate is unsubstituted.

* * * * *